BEST AVAILABLE COPY

Gambrill & Burgee.
Carding Engine.

No. 509. Reissued Nov. 17, 1857.

N. PETERS, PHOTO-LITHOGRAPHER, WASHINGTON, D. C.

Sheet 2. 2 Sheets.

Cambrill & Burgee.
Carding Engine.

No. 509. Reissued Nov. 17, 1857.

N. PETERS, PHOTO-LITHOGRAPHER, WASHINGTON, D. C.

UNITED STATES PATENT OFFICE.

H. N. GAMBRILL AND S. F. BURGEE, OF WOODBURY MILLS, MARYLAND.

IMPROVEMENT IN CARDING-MACHINES.

Specification forming part of Letters Patent No. 12,469, dated February 27, 1855; antedated August 22, 1854; Reissue No. 509, dated November 17, 1857.

*To all whom it may concern:*

Be it known that we, HORATIO N. GAMBRILL and SINGLETON F. BURGEE, of Woodbury Mills, in the county of Baltimore and State of Maryland, have invented certain new and useful Improvements in Carding-Engines for Carding Cotton; and we do hereby declare the following to be a full, clear, and exact description of the same, reference being had to the accompanying drawings, making a part thereof, in which—

Figure 1:
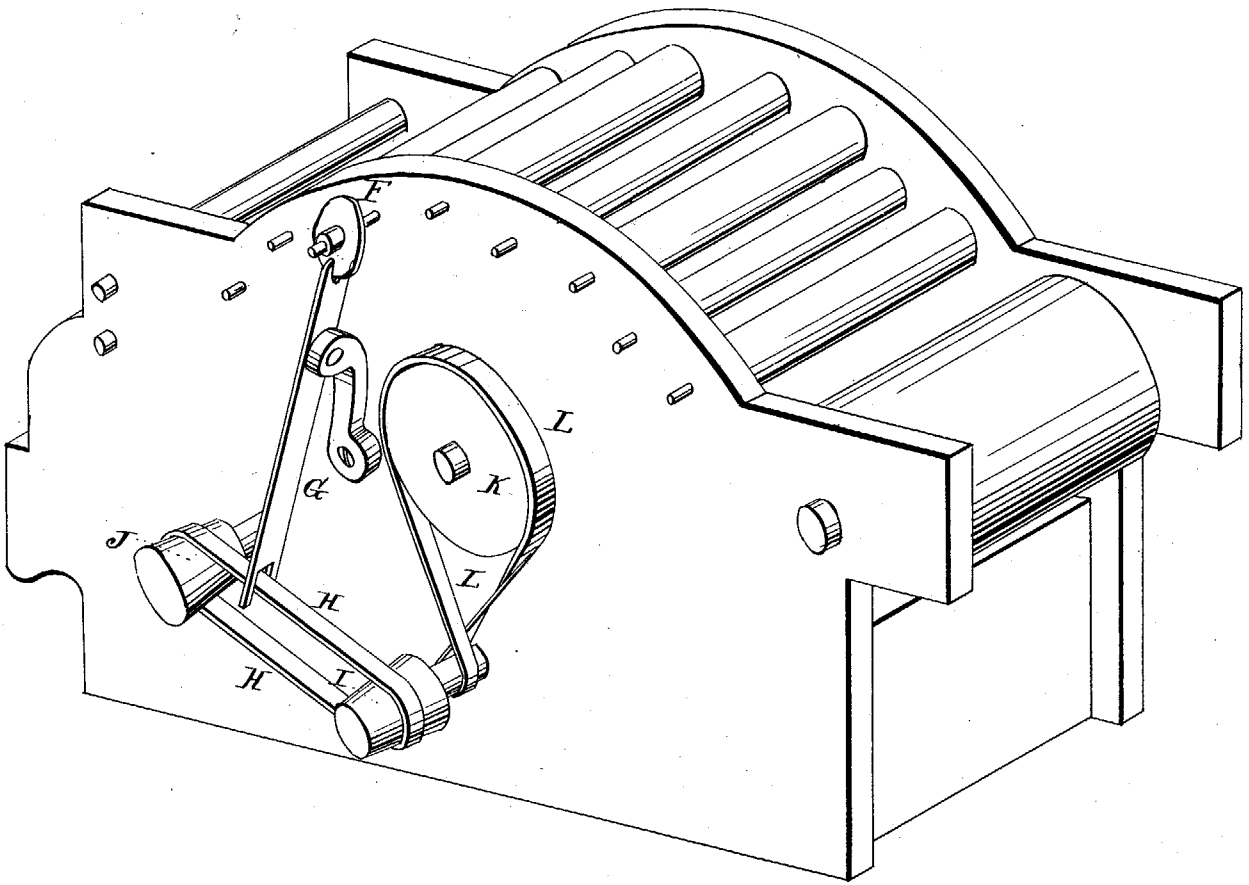
Figure 2:
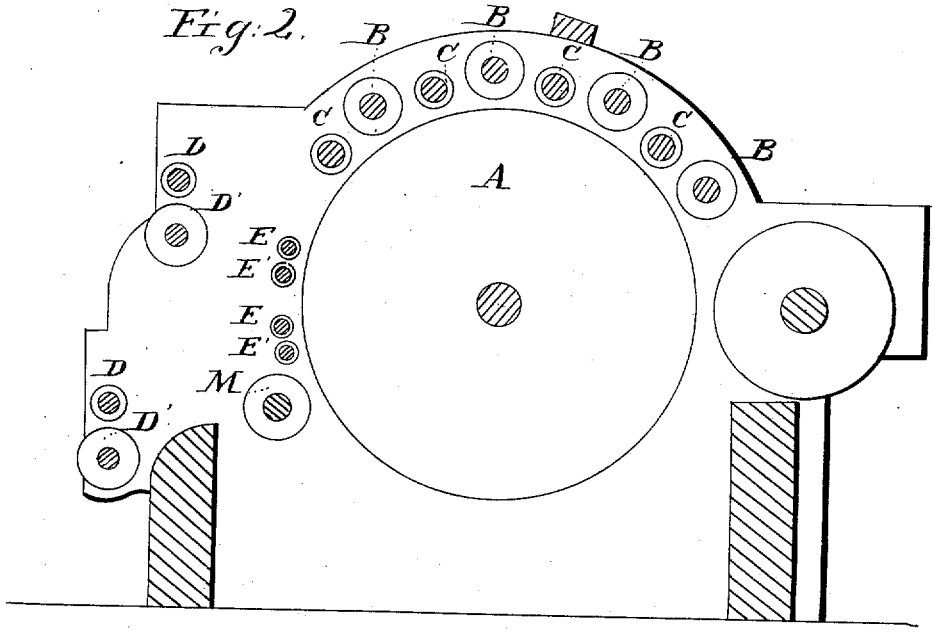
Figure 3:
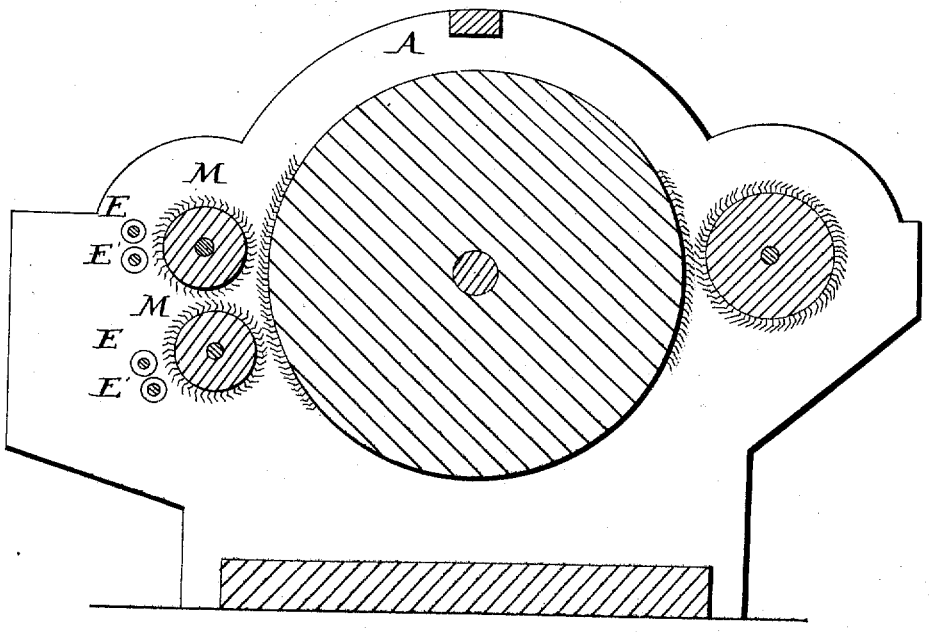

Figure 1 represents a perspective view of the engine. Fig. 2 represents a longitudinal vertical section of the same. Fig. 3 represents a similar section as in Fig. 2, with "whippers-in" or "lickers-in" introduced between the feed-rollers and the main cylinder.

Similar letters in the several figures denote like parts.

Carding-engines as at present constructed are limited in their operation from two causes: First, the working-cylinder is capable of holding and working double as much cotton as can with safety be fed onto it with one pair or set of feeding-rollers, for to force the feeding of the cotton requires either a highly-increased speed to the feeding-rolls, which makes their operation uncertain, or the lap must be increased in thickness, which strains the carding teeth or wires, and if carried to any extent would make it impossible for the teeth to pass through the lap at all so as to accomplish the carding operation; second, the engine must be repeatedly stopped to clean the working-cylinder of the cotton, dirt, &c., which becomes packed therein so as to prevent the accomplishing of good work. Besides, the cleaning of the working-cylinder every time it is done, in addition to the stoppage and expense of so cleaning, varies the operation, it being reasonable that when packed with cotton, &c., which is not removed by any of the working parts of the machine, the cylinder will not take from the rolls and deliver to the workers or doffer the same amount of material that it can when divested of this constantly accumulating dirt, &c. Thus by the present system the operation of carding is a constantly varying one, while the main portions of the machine are restricted in the amount of work which they are capable of performing by the imperfection of some of the minor parts of the machine.

The object of our invention is twofold; first, to increase the capacity of those parts which have heretofore restricted the operation of the machine, and to clean the main working-cylinder while it is in motion by a continuous process, or which might with propriety be said to be a process which prevents the cotton, gum, &c., from becoming packed on the cylinder, and thus save the time and expense of cleaning.

The nature of our invention, therefore, may be stated as follows: First, in the application of two or more pairs or sets of feeding-rolls or their equivalent appliances, whether used alone or in connection with lickers-in, which will deliver the cotton onto the working-cylinder at two or more points for the purpose of feeding in as much as the cylinder can carry without making or causing the teeth to pass through so thick a lap as to endanger their breaking or bending, and to keep the feeding-rollers at a moderate rate of speed, and perform one-third more work without any but a very slight expense to the machine; second, so gearing the main working-cylinder and stripper as that their relative velocities or motions may be periodically reversed or changed by an automatic shipper or other equivalent mechanical appliances, and so that the cylinder shall strip the stripper and the stripper strip the cylinder at regular intervals, which entirely prevents the accumulation or packing upon the working-cylinder, and enables it to run for weeks without cleaning, this being rather a preventive of than a remedy for this inconvenience in carding-engines.

To enable others skilled in the art to make and use our invention, we will proceed to describe the same with reference to the drawings, confining the description more closely to the novel features of the invention.

A represents the main cylinder, B the workers, and C the strippers, which may be made and operated in any of the usual well-known ways. The doffer also may be made in the usual form.

D D′ D D′ represent two pairs or sets of lap-rollers, and E E′ E E′ two pairs or sets of feeding-rollers by which the lap is fed onto the working-cylinder A at two points thereon. The advantages of this arrangement are particularly set forth in the object and nature of our invention, being for the purpose of furnishing the fleece or lap in thin sheets to the main working-cylinder without increasing the velocity of the feed-rollers or causing the card-teeth to pass through so thick a fleece and strain or break them, and also to furnish to the main cylinder a greater amount of material, which, from its size, it is fully capable of receiving and working, and greater than can be delivered to it with safety or economy by one set of feeding-rollers only. And we would here state that, although we have represented two pairs or sets of feeding-rollers, more may be used, and instead of feeding-rollers alone we may use "leaders-in" or "lickers-in," as they are termed, in connection with the feed-rollers, the object being to deliver the material onto the working-cylinder at two or more points, and in doing so the material that is taken from the top pair of rolls is worked by the lickers-in before it reaches the main cylinder, and thus the "lickers-in" perform the double function of conveyers and workers.

On the end of one of the workers we attach a cam, F, which works in a fork in the end of a shipper, G. This shipper G at its lower end straddles an endless belt, H, which passes around two conical pulleys, I J. One of the conical pulleys, I, receives its motion from a pulley, K, on the shaft of the main working-cylinder A and transmits motion through the belt H to the conical pulley J, placed on the shaft of a stripper, (M, Fig. 2.) These cone-pulleys stand in a reversed position in relation to each other, and when the belt H is equidistant from the extreme ends of the cone-pulleys the relative velocities of the peripheries of the main cylinder A and of the stripper M are the same; but as the cam F revolves the shipper carries the belt H back and forth from end to end of the cone-pulleys and changes their relative velocities, so that about half the time the cylinder A′ is stripping the cylinder M, while during the remaining period, or half the time, the cylinder M the main cylinder. Thus by an automatic movement the functions of these cylinders are reversed at regular intervals, which prevents the material from clogging or packing upon the main cylinder and avoids the necessity of stopping the machine to clean the main cylinder, the cotton being constantly loosened up and taken off by the workers. It is obvious that, instead of getting these reversed movements by the means herein specified, they may be had by gearing up or down from any other of the moving parts of the machine; and by the aid of these appliances from thirty to fifty per cent. more work can be done than by machines as ordinarily constructed without them. And as one of the means or modifications of the getting up of these alternating motions of the stripper and main cylinder, the stripper, instead of merely changing its velocity in the same direction, may have its motion reversed, or so as to run backward at stated periods and produce the same result.

By this method of constantly stripping the main cylinder it is found that the "waste" is much less than by any other carding-machine known to us. This may be accounted for by the constantly loosening up of the cotton on the main cylinder, and to the facility which such loosening up gives to the doffer to take everything from the cylinder.

In Fig. 3 we have shown the manner in which we have applied and used the lickers-in in connection with the feed-rollers, said "lickers-in" being represented at M M. The material from the upper pair of feed-rollers in passing to the cylinder is worked between the lickers-in, and thus they perform the double duty of conveyers or carriers and workers.

Having thus fully described the nature of our invention, what we claim therein as new, and desire to secure by Letters Patent, is—

1. The application of two or more sets or pairs of feeding-rollers to the working-cylinder of carding-engines substantially in the manner and for the purpose set forth, and this we claim, whether said feed-rollers deliver the material directly onto the main cylinder or to lickers-in, when said lickers-in are so arranged as to work in connection with each other and with the main cylinder for the purpose and in the manner substantially as set forth.

2. The reversing of the relative velocities of the peripheries of the main working-cylinder and stripper M at intervals by an automatic movement, for the purpose of cleaning or preventing the clogging of the main cylinder, substantially as described.

HORATIO N. GAMBRILL.
SINGLETON F. BURGEE.

Witnesses:
STEPHEN BARTON,
HENRY W. GAMBRILL.